United States Patent [19]

Barta et al.

[11] 4,232,952
[45] Nov. 11, 1980

[54] ACOUSTO-OPTIC DEVICE

[75] Inventors: Cestmir Barta; Jiri Ctyroky, both of Prague, Czechoslovakia; Iraida M. Silvestrova; Jurij V. Pisarevskij, both of Moscow, U.S.S.R.

[73] Assignee: Ceskoslovenska akademie ved, Prague, Czechoslovakia

[21] Appl. No.: 25,267

[22] Filed: Mar. 29, 1979

[30] Foreign Application Priority Data

Apr. 1, 1978 [CS] Czechoslovakia .................. 2106/78

[51] Int. Cl.³ .............................................. G02F 1/33
[52] U.S. Cl. .................................................. 350/358
[58] Field of Search ........................................ 350/358

[56] References Cited
U.S. PATENT DOCUMENTS 3,843,234 10/1974 Dobrzhansky ...................... 350/358

*Primary Examiner*—William L. Sikes

[57] ABSTRACT

A single crystal of pure or mixed univalent mercury halide is formed having a first face perpendicular to the direction [A] which is inclined about the crystallographic direction [1$\bar{1}$0] by an angle $\alpha$. The crystal is simultaneously inclined from the crystallographic direction [1$\bar{1}$0] about the direction [A] by an angle $\beta$ so that the two opposite faces for entrance and exit of the light wave are parallel to the direction [A] and [B]. The first face of the parallelepiped is provided with an acoustic wave.

2 Claims, 1 Drawing Figure

ACOUSTO-OPTIC DEVICE

BACKGROUND OF THE INVENTION

The present invention relates to an acousto-optic device particularly suitable for deflecting light beams in devices used for information processing, laser display, holographic devices, and the like, wherein the diffraction of light is obtained by application of an acoustic wave.

Acousto-optic devices used hitherto for deflecting light beams for optical information processing operate on the principle of the diffraction of light waves by an acoustic wave induced in a suitable optical crystal medium by a piezoelectric transducer. By changing the frequency of the acoustic wave, the deflection angle of the light beam is changed; while, by changing the amplitude of the acoustic wave the intensity of the deflected beam is controlled. A change of the polarization of the light wave can also result from the diffraction by acoustic wave. Depending on whether the device is used in systems for deflecting the light beams—deflectors—or in systems used for information processing, the most important parameters of an acousto-optic device are the diffraction efficiency, i.e. the ratio between the intersities of the deflected and incident beam, and the product of the time constant $\tau$ of the device with the width $\Delta f$ of the frequency band. This bandwidth is determined on the one hand by the electric and acoustic properties of the piezoelectric transducer and on the other hand by the interaction bandwidth of the acoustic and light wave. An extremely large bandwidth of acousto-optic interaction can be attained in an optically anisotropic medium by making use of the so-called abnormal diffraction, in which the polarization of the deflected beam changes. In an optically uniaxial media the transverse acoustic wave is introduced, as a rule in a direction parallel to or perpendicular to the optical axis, whereas the direction of the incident beam is chosen so as to have the deflected beam emerging perpendicular to the optical axis.

In using the crystal types know so far, the described arrangement leads to rather high acoustic frequencies in the giga hertz range and the diffraction efficiency is low.

In the crystal of paratellurite (tellurium dioxide TeO$_2$) strong rotation of the polarization plane of light can be used for the construction of an acousto-optic device with abnormal diffraction and high diffraction efficiency. The operating frequency of such acousto-optic device is relatively low, in the range of tens of megahertz, depending on the wavelength of light employed. In this case, however, the incident light must have approximately circular polarization.

An acousto-optic deflector utilizing the abnormal diffraction in a rotated tellurium dioxide crystal has been also known. The acoustic wave in the tellurium dioxide crystal propagates in the direction inclined at angle of 6° from the [110] axis in the ($\bar{1}$10) plane, with the [$\bar{1}$10] direction of vibrations. This arrangement retains the high efficiency of interaction and eliminates the decrease of the diffraction efficiency in the middle of the frequency band. A disadvantage of this deflector is that the group velocity direction of the acoustic wave is inclined from the wave normal at a large angle, nominally 51.3°. Consequently, an extremely large crystal volume is required for the construction of such a deflector. Besides, the deflectors made from the tellurium dioxide crystals cannot be used in the infrared spectral range beyond 5 $\mu$m. Another disadvantage is the relatively high price for the tellurium dioxide single crystals of the required dimensions and quality. In addition, still another disadvantage of the acousto-optic device made from tellurium dioxide consists in the fact that the acousto-optic quality factor M$_2$, which determines the diffraction efficiency for the diffraction by longitudinal waves, is rather small—about 1/30 of the value for the diffraction by transverse waves.

There is described in Dobrzhanskii et al CSSR Author's Certificate No. 170,007, an acousto-optic device made from a single crystal of univalent mercury halide, as described, which has high value of the acousto-optic quality factor M$_2$ for both longitudinal and transverse waves. In addition, it transmits radiation even in the infrared spectral range with wavelengths larger than 5 $\mu$m. A disadvantage of this device, however, is that, due to the low propagation velocity of the acoustic wave, sufficient frequency bandwidth can be obtained only by using a piezoelectric transducer of very small dimensions, whereby the requirements on the acoustic power density generated by the transducer are very severe.

There is also known two acousto-optic devices made from single crystals of univalent mercury halide, as described by C. Barta et al in U.S. Pat. Applications Ser. No. 968,930 filed Dec. 13, 1978 and Ser. No. 006,498 filed Jan. 25, 1979. The first device operating in the anomalous diffraction regime can be used even for infrared radiation of wavelengths larger than 5 $\mu$m and can utilize efficient diffraction on longitudinal as well as on transverse wave; nevertheless, it does not suppress parasitic diffraction into the second diffraction order. This results in a drop of diffraction efficiency in the centre of the frequency band. The second acousto-optic device, which avoids the drop of the diffraction efficiency in the centre of the frequency band does not make possible the employment of diffraction on longitudinal acoustic waves. Such a result would have enabled the increase in the speed of the device several times.

The above mentioned shortcomings are voided in the acousto-optic device formed in accordance with the invention.

SUMMARY OF THE INVENTION

According to the present invention, a single crystal of pure or mixed univalent mercury halide is formed with a first face that is rotated so as to be perpendicular to a direction inclined from the crystallographic direction [110] about the crystallographic direction [1$\bar{1}$0] by an angle whose value lies from 0.5° to 20°, so that the edge of the crystal that was formerly parallel to the [110] direction lies in the direction [A]. The single crystal is also rotated from the crystallographic direction [1$\bar{1}$0] about the direction [A] by the angle whose value lies from 0.5° to 15° so that the crystal edge that was formerly parallel to the [1$\bar{1}$0] direction lies now in the direction [B]. The first face of the parallelepiped obtained in this way is in a plane which is perpendicular to the [A] direction and has two other opposite faces lying in planes which are parallel to both the [A] and [B] directions simultaneously. The source of the acoustic waves is located on the first face of the parallelepiped. The other two opposite faces are polished for the entrance and exit of the light wave.

Full details of the present invention are set forth in the following description and are illustrated in the accompanying drawings.

BRIEF DESCRIPTION OF THE DRAWINGS

In the drawing, the single FIGURE illustrates an acousto-optic device formed of an optically anisotropic medium of a single crystal of univalent mercury halide.

DESCRIPTION OF THE INVENTION

Figure 1:
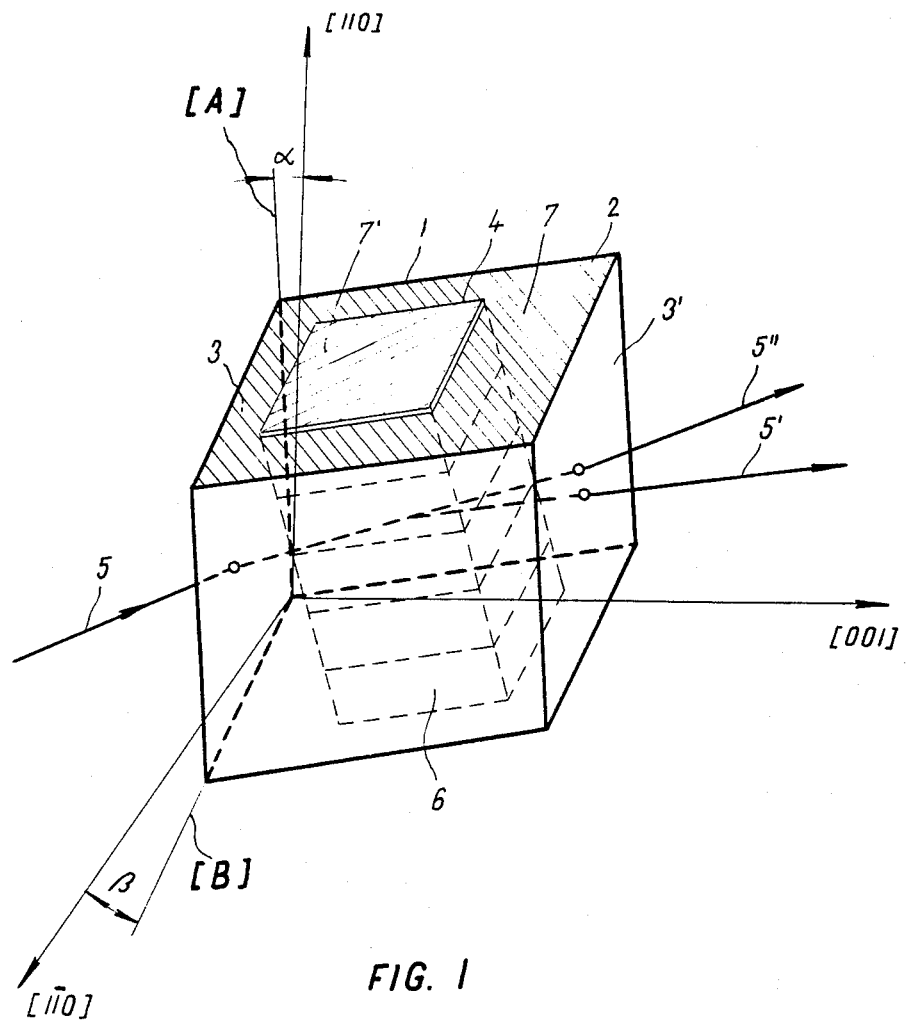

The following Examples set forth several illustrative embodiments of the present invention each of which can be clearly followed with the single drawing in which the crystal formation is schematically shown. In each of the examples an acousto-optic device formed of a single anisotropic crystal structure of univalent mercury halide (roughly illustrated in cubic form) having an acoustic wave source 4. The source 4 is a peizo-electric transducer formed preferably of a single crystal of a lithium compound such as lithium niobate $LiNbO_3$, lithium iodate $LiIO_3$, lithium tantalate $LiTaO_3$, and silicon dioxide $SiO_2$.

The source 4 of acoustic wave may also take the form of a combined system of a plate and a prism of material which has a low attenuation of the acoustical waves such as a fused quartz, which prism is fastened on the top of the single crystal, for example by means of an epoxide resin. On the prism is placed a plate of the piezo-electrical material such as the single-crystal of the lithium niobate $LiNbO_3$. In the case when the source 4 is a mere plate, the bottom area is gilded.

The crystal is ground and formed into a plate, the thickness of which and the crystallographic orientation of which is chosen and thus formed, to provide the frequency and kind of wave desired for each of the respective optic crystals of the examples. The ground plate is equipped with electrodes 7 and 7'.

EXAMPLE 1.

An acousto-optic device is formed of a single crystal generally indicated by the numeral 1 of mercurous chloride whose first face 2 is perpendicular to the direction inclined from the crystallographic direction [110] about the direction [$\overline{1}10$] by an angle $\alpha$ equal to 4° so that the crystal edge that was originally formerly parallel to the [110] direction points in the direction [A]. At the same time, the single crystal 1 is inclined from the crystallographic direction [$\overline{1}10$] about the direction [A] by an angle $\beta$ equal to 2° so that the crystal edge that was formerly parallel to the [$\overline{1}10$] direction points in the [B] direction. The first face 2 of the parallelepiped thus formed is perpendicular to the [A] direction and the other opposite faces 3, 3', are simultaneously parallel to the direction [A] and [B].

The first face 2 of the single crystal 1 is provided with the source of acoustic waves 4. The other opposite faces 3, 3' are polished for the entrance 5, the normal exit 5', and the acoustically deflected exit 5" of the light wave. Polishing the other faces is not necessary, however, it can be advantageous in some cases. It is also not required that all faces of the single crystal 1 should be mutually perpendicular.

The acoustic wave 6 emitted by the source 4 propagates through the single crystal 1 and interacts with the light wave 5. In consequence of this interaction there occurs a deflection in the direction of the incoming light wave 5 from the normal outgoing direction 5', as existing without the interaction, into the outgoing direction 5". The acoustic deflection angle depends on the frequency of the acoustic wave.

EXAMPLE 2.

An acousto-optic device is prepared as in Example 1, consisting of a single crystal of mercurous chloride with inclination angles $\alpha=15°$; $\beta=7° 15'$ the remaining factors being the same.

EXAMPLE 3.

An acousto-optic device is prepared similar to the arrangement described in Example 1, but consisting of a single crystal of mercurous bromide. The angle $\alpha$ is equal to 20° and the angle $\beta$ is equal to 0.5°. The remaining parameters are similarly defined.

EXAMPLE 4.

An acousto-optic device is prepared similar to the arrangement described in Example 1, but consisting of a single crystal of mercurous iodide. The angle $\alpha$ is equal to 0.5° and the angle $\beta$ is equal to 15°. The remaining parameters are similarly defined.

The acousto-optic devices according to the invention are usable for deflecting light beams in data recording systems, in the large-surface laser displays, in holographic memories, in the systems for optical processing of information-signal compression, adapted filtration, correlation, and elsewhere.

The acousto-optic devices according to the present invention have the particular advantage that the high values of the acousto-optic quality factor and the high optical and elastic anisotropy of univalent mercury halide crystals can be simultaneously utilized, whereby the parameters of the acousto-optic devices are improved considerably.

Further, by using slow transverse acoustic waves, the devices can handle signals of longer duration than can devices formed of tellurium dioxide.

The acousto-optic devices according to the present invention require smaller crystals than the acousto-optic device known hitherto for comparable values of the other parameters.

A further advantage of the acousto-optic device according to the invention, as compared to the acousto-optic device made from univalent mercury halide according to the CSSR Author's Certificate No. 170,007, consists in utilizing the optical anisotropy of the given crystal, so that the acousto-optic device according to the present invention operates in the anomalous diffraction regime. This regime makes it possible, with all other parameters being maintained, to increase by several times the interaction length of both the acoustic and light wave and thus reduce the required power input of the high frequency electrical excitation, or increase the frequency bandwidth of the device at the same length and input power, or increase accordingly both the bandwidth and length.

The advantage of the acousto-optic unit according to the invention, as compared to the first quoted acousto-optic device described by C. Barta, et al consists in removing the drop in the diffraction efficiency in the centre of the frequency band while maintaining all other parameters. The advantage of the acousto-optic device according to the invention, as compared with the second quoted acousto-optic device described by C. Barta, et al lies in the ability to utilize diffraction on longitudinal acoustic wave, which results in a higher operating speed of the device.

For a comparative example, the acousto-optic device made as described in Example 2 of a single crystal of mercurous chloride, with inclination angles $\alpha=15°$, $\beta=7°\ 45'$ utilizing a transducer of length L=0.6 mm, operating on transverse waves, has the acousto-optic interaction bandwidth equal to 100 MHz. The same bandwidth can be attained also for the diffraction by longitudinal waves even with a much thicker transducer. In comparison with the arrangement according to the CSSR Author's Certificate No. 170,007, the example results in a device in which a decrease of the required electric input power in an order of magnitude and in a decrease of the power density emitted by the transducer by about two orders of magnitude are obtained. As compared to the first of the acousto-optic devices quoted by C. Barta et al the drop of the diffraction efficiency in the centre of the band is avoided, and, contrary to the second acousto-optic device described by C. Barta et al, the acousto-optic device according to the present invention can be operated also with longitudinal acoustic waves.

Although several embodiments and variations have been suggested herein, others will be obvious to those skilled in this art. Accordingly, the present disclosure should be taken as illustrative only and not as limiting of the scope of this invention.

What is claimed:

1. An acousto-optic device comprising a single crystal of pure or mixed univalent mercury halide formed in the shape of a parallelepiped having a first face provided with a source of acoustic wave, and a pair of opposite faces polished for the entrance and exit of light waves, said first face being perpendicular to the direction [A], said direction [A] being inclined from the crystallographic direction $[\overline{1}10]$ about the crystallographic direction $[\overline{1}\overline{1}0]$ by an angle $\alpha$ said crystal being simultaneously inclined from the crystallographic direction $[\overline{1}10]$ about the direction [A] by an angle $\beta$ so that the edge formerly parallel to the $[\overline{1}10]$ direction points in the direction [B] and two opposite faces are simultaneously parallel to the directions [A] and [B].

2. The device according to claim 1, wherein $\alpha$ is between 0.5° and 20° and $\beta$ is between 0.5° and 15°.

* * * * *